(12) United States Patent
Ueda

(10) Patent No.: US 6,731,199 B1
(45) Date of Patent: May 4, 2004

(54) NON-CONTACT COMMUNICATION SYSTEM

(75) Inventor: Takashi Ueda, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/359,651

(22) Filed: Jul. 26, 1999

(30) Foreign Application Priority Data

Jul. 27, 1998 (JP) .......................................... H10-210896

(51) Int. Cl.⁷ ................................................. H04Q 5/22
(52) U.S. Cl. .................... 340/10.4; 340/10.3; 340/10.34
(58) Field of Search .............................. 340/10.1, 10.3, 340/10.4, 825, 572.2, 10.34, 572.1, 572.4; 235/380

(56) References Cited

U.S. PATENT DOCUMENTS

| | | | | |
|---|---|---|---|---|
| 3,299,424 A | * | 1/1967 | Vinding ...................... 235/439 |
| 3,859,624 A | * | 1/1975 | Kriofsky et al. ............. 187/391 |
| 4,814,595 A | * | 3/1989 | Gilboa ........................ 235/487 |
| 4,899,036 A | * | 2/1990 | McCrindle et al. .......... 235/380 |
| 5,113,184 A | * | 5/1992 | Katayama ................. 340/10.51 |
| 5,305,008 A | * | 4/1994 | Turner et al. ................... 342/44 |
| 5,418,353 A | * | 5/1995 | Katayama et al. ........... 235/380 |
| 5,523,749 A | * | 6/1996 | Cole et al. ................. 340/10.34 |
| 5,689,239 A | * | 11/1997 | Turner et al. ................ 235/383 |
| 5,866,891 A | * | 2/1999 | Fujimoto et al. ............ 235/380 |
| 6,169,474 B1 | * | 1/2001 | Greeff et al. .............. 340/10.1 |

* cited by examiner

*Primary Examiner*—Brian Zimmerman
*Assistant Examiner*—Clara Yang
(74) *Attorney, Agent, or Firm*—Arent Fox Kintner Plotkin & Kahn

(57) ABSTRACT

In a non-contact communication system, when an interrogator is attempting to detect that a responder is present in a range communicable therewith, the interrogator transmits a weak radio wave from its tuning circuit. The responder receives this radio wave and acquires electric power by rectifying it, but, because the electric power thus obtained is insufficient, the responder is turned on and off repeatedly at regular intervals. This causes variation in the impedance with which the tuning circuit is loaded. The interrogator, by detecting this variation in the impedance occurring at regular intervals, recognizes that the responder is present within the range communicable therewith. Only then, the interrogator transmits a radio wave strong enough to permit the responder to acquire sufficient electric power.

7 Claims, 7 Drawing Sheets

NON-CONTACT COMMUNICATION SYSTEM

BACKGROUND OF THE INVENTION

1. Field of the Invention

The present invention relates to a non-contact communication system in which a radio wave transmitted from an interrogator is received by a responder and the responder produces electric power from the received radio wave and in addition reproduces data from a modulated signal carried by the received radio wave in order to transmit, in reply to the received data, reply data back to the interrogator.

2. Description of the Prior Art

Conventionally, as a non-contact communication system, radio-frequency tags (RF tags) and ID cards are known that acquire electric power from a radio wave transmitted from an antenna in order to transmit the data stored in themselves. Such systems are used, for example, with the lift facilities at a skiing ground, with the ticket examination equipment at a railway station, and for sorting of baggage in general.

Such RF tags and ID cards are formed as a non-contact card that has a nonvolatile memory and a transmitter/receiver unit incorporated therein but that has no power source such as a battery. Such a non-contact card operates on the electric power it produces from a radio wave (radio-frequency modulated signal) it receives. Moreover, such a non-contact card communicates data with its communication partner by using a radio wave, and thus offers the advantage of non-contact data communication.

In such a non-contact communication system, a non-contact card is used, for example, as a responder. The responder receives a radio wave transmitted from an interrogator and acquires electric power from the received radio wave. Therefore, conventionally, the interrogator needs to be kept transmitting all the time a radio wave for communication that carries electric power sufficiently strong to permit the responder to operate at a relatively remote location. Thus, in this non-contact communication system, even when no responder is present within the range in which communication is possible, the interrogator needs to be kept transmitting the radio wave for communication, and this clearly is a waste of electric power.

Moreover, in this non-contact communication system, it is undesirable in the first place to keep the interrogator transmitting all the time a radio wave that carries electric power sufficiently strong to permit the responder to operate, because this may cause interference with the operation of other electric equipment, or may have adverse effects on human bodies.

SUMMARY OF THE INVENTION

An object of the present invention is to provide a non-contact communication system in which an interrogator consumes less electric power to transmit a radio wave.

Another object of the present invention is to provide a non-contact communication system in which the radio wave that an interrogator transmits when it is not communicating with a responder does not cause interference with the operation of other electric equipment nor have adverse effects on human bodies.

To achieve the above objects, according to one aspect of the present invention, in a non-contact communication system provided with a first communication unit for radiating a radio wave for communication and a second communication unit for communicating with the first communication unit, the first communication unit generates a radio wave for detection weaker than the radio wave for communication so that the first communication unit, by detecting a predetermined change in the radio wave for detection, recognizes that the second communication unit is present within a range communicable with the first communication unit and then starts transmitting the radio wave for communication.

According to this configuration, when the second communication unit is not present in the range communicable with the first communication unit and thus neither of them is performing communication operation, the first communication unit transmits a radio wave weaker than the radio wave it transmits for ordinary communication. Thus, less electric power is consumed and accordingly higher energy efficiency is attained than in a conventional system that requires that a strong radio wave for communication be kept transmitted all the time.

Moreover, when the second communication unit is not present in the range communicable with the first communication unit and thus neither of them is performing communication operation, the first communication unit transmits a radio wave weaker than the radio wave it transmits for ordinary communication. Thus, as long as no communication operation takes place, there is less possibility of interference with other electric equipment or adverse effects on human bodies.

Moreover, in the non-contact communication system according to the present invention, the first communication unit transmits alternatively the radio wave for communication or the radio wave for detection by using a single transmission means shared between those two radio waves. Using a single transmission means to transmit the radio wave for communication and the radio wave for detection eliminates the need to provide separate transmission means to transmit the radio wave for communication and the radio wave for detection. Thus, the first communication unit used here can be obtained simply by making a few modifications to a conventional configuration thereof, and thus does not require a larger-scale configuration.

Moreover, in the non-contact communication system according to the present invention, repeated activation and deactivation of the second communication unit occur at regular intervals because the radio wave for detection transmitted from the first communication unit is so feeble as to be equal to critical strength that divides between activation and deactivation of the second communication unit when the second communication unit is present within the range communicable with the first communication unit. The non-contact communication system is provided with a detecting means for detecting variation of amplitude in the radio waves transmitted from the first communication unit resulting from such repeated activation and deactivation of the second communication unit, a checking means for checking whether the second communication unit is present within the range communicable with the first communication unit or not on a basis of an output from the detecting means, and a control means for controlling the first communication unit to transmit the radio wave for communication on a basis of an output from the checking means.

According to this configuration, the radio wave for detection generated by the first communication unit when the second communication unit is out of the range communicable with the first communication unit is so feeble relative to the radio wave for communication as to generate electric power of critical strength that divides activation and deactivation of the second communication unit, and thus the second communication unit is activated and deactivated repeatedly at regular intervals. This causes variation to occur at regular intervals in the impedance with which the tuning circuit of the first communication unit is loaded. The first communication unit, by detecting this variation occurring at regular intervals, recognizes the presence of the second communication unit. Moreover, the second communication unit does not require any circuit other than the one which performs communication to make the first communication unit recognize the presence of the second communication unit, and thus the second communication unit having the same configuration as in a conventional system can be used in the non-contact communication system according to the present invention.

Moreover, in the non-contact communication system according to the present invention, the second communication unit has a signal generating means for generating a reply signal when the second communication unit catches the radio wave for detection so as to make the first communication unit recognize that the second communication unit is present within the range communicable with the first communication unit.

The second communication unit has a circuit that can operate on the insufficient electric power obtained from a radio wave that is generated by the first communication unit so as to be weaker than the radio wave for communication. In addition, this circuit keeps the weaker radio wave modulated at a fixed frequency all the time. Thus, when the first communication unit is made to recognize that the second communication unit is present in the range communicable therewith, the first communication unit can be fed with a signal that does not depend on the characteristics of the circuit provided within the second communication unit for achieving communication.

According to another aspect of the present invention, in a non-contact communication system provided with a first communication unit for radiating a radio wave for communication and a second communication unit for communicating with the first communication unit, a mechanical or optical sensor is provided within the first communication unit so that the first communication unit starts transmitting the radio wave for communication when the first communication unit recognizes that the second communication unit is present within the range communicable with the first communication unit. This makes it possible to reduce the electric power consumed when no communication takes place between the two communication units, and eliminate the possibility of serious interference with other electric equipment or adverse effects on human bodies.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
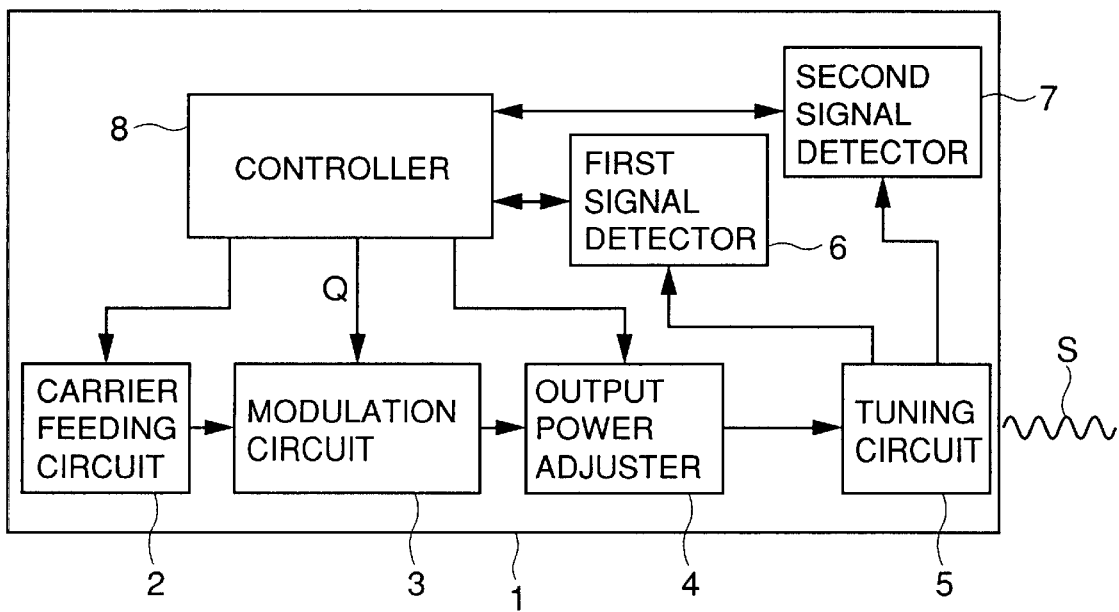
FIG. 1 is a block diagram showing the internal configuration of the interrogator adopted in a first and a second embodiment of the invention.

A first embodiment of the present invention will be described with reference to FIGS. 1 to 3. FIG. 1 is a block diagram showing the internal configuration of the interrogator 1 employed in the first embodiment.

The interrogator 1 has a controller 8, a carrier feeding circuit 2 for feeding a carrier having a predetermined frequency f, a modulation circuit 3 for modulating the carrier in accordance with the data fed from the controller 8, an output power adjuster 4 for controlling the output power of the carrier, a tuning circuit 5 having functions of transmitting and receiving a radio wave S, and a first signal detector 6 and a second signal detector 7 for detecting a reply signal from a responder 10, which will be described later. The controller 8 is composed of a microcomputer or the like, and controls the carrier feeding circuit 2, the modulation circuit 3, the output power adjuster 4, the first signal detection circuit 6, and the second signal detection circuit 7.

Figure 2:
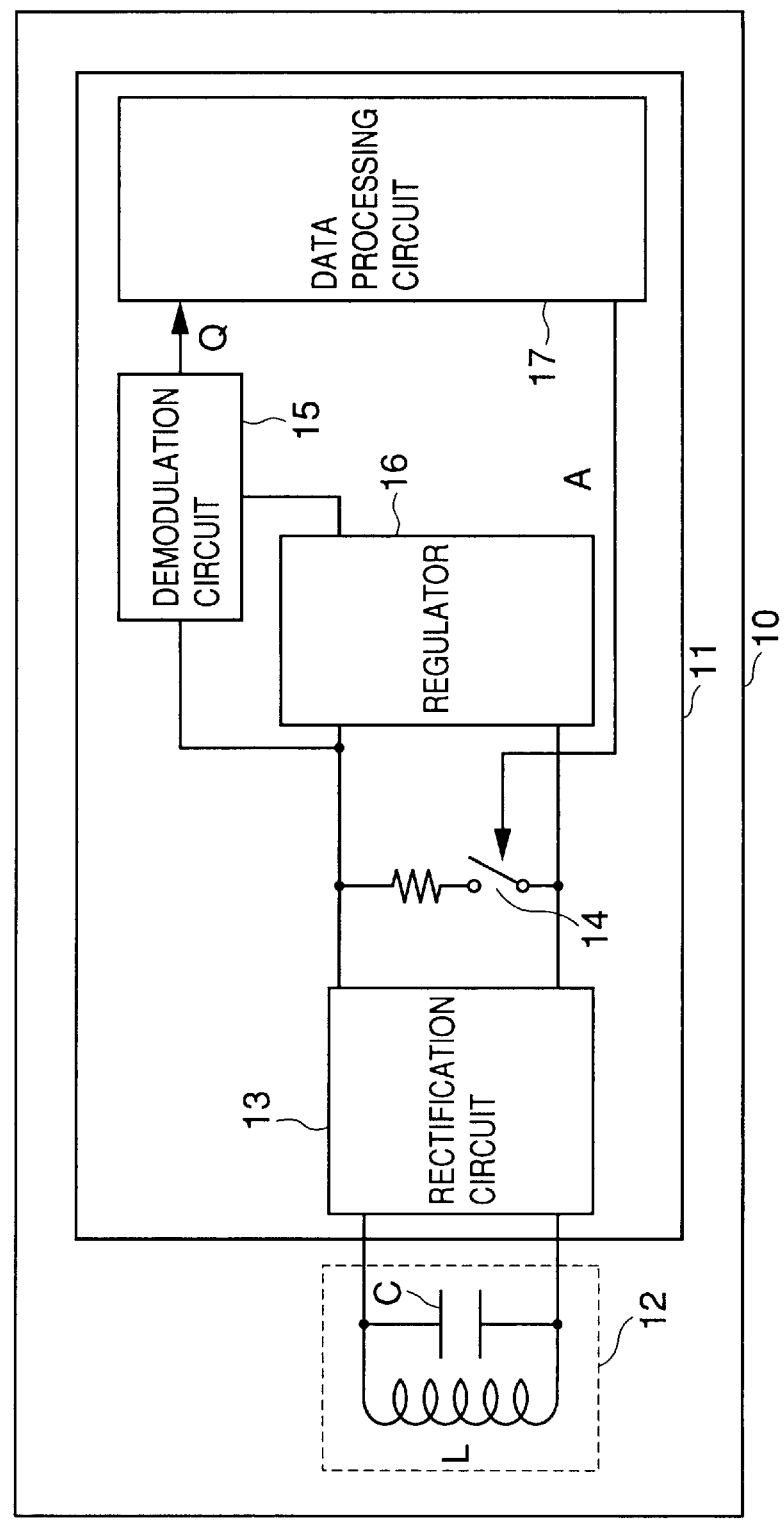
FIG. 2 is a block diagram showing the internal configuration of the responder adopted in the first and a third embodiment of the invention.

FIG. 2 is a block diagram showing the internal configuration of a responder 10 having an integrated circuit (I/C) 11. The responder 10 has a tuning circuit 12 that tunes in to the carrier having the frequency f transmitted from the interrogator 1, and also has, within the IC 11, a rectification circuit 13, a switch 14, a demodulation circuit 15, a regulator 16, and a data processing circuit 17. The tuning circuit 12 is composed of an inductor L and a capacitor C.

In a non-contact communication system employing an interrogator 1 and a responder 10 that are configured as described above, when the responder 10 is not present in a range communicable with the interrogator 1, the controller 8 controls the output power adjuster 4 so that a radio wave adjusted by the output power adjuster 4 to be 10 dB weaker than a radio wave used in ordinary communication (hereafter referred to as the radio wave for communication) is transmitted from the tuning circuit 5. In the following descriptions of the present specification, this radio wave, which is transmitted to allow detection of whether the responder 10 is present in the communicable range or not, will be referred to as the radio wave for responder detection.

The power of the radio wave for responder detection is so set as to be weak enough to have no effects on other electric equipment and equal to critical strength that is between the strength that produces sufficient electric power to activate the responder 10 within a predetermined range and the strength that does not. The critical strength differs according to the characteristics of the responder. The radio wave for responder detection, for which the controller 8 feeds no modulation signal to the modulation circuit 3, has a waveform as shown at (a) in FIG. 3.

Although no modulation signal is added to the radio wave for responder detection as described above in this embodiment, it is also possible to use as the radio wave for responder detection a radio wave having a modulation signal added thereto.

When the radio wave for responder detection is being transmitted, the controller 8 keeps active the carrier feeding circuit 2, the output power adjuster 4, and the second signal detector 7, whereas it keeps the first signal detector 6 inactive. In this state, the controller 8 feeds no modulation signal to the modulation circuit 3. Hereafter, this state will be referred to as the detection mode. On the other hand, the state in which non-contact communication with the responder 10 is taking place will be referred to as the communication mode.

Figure 4A:
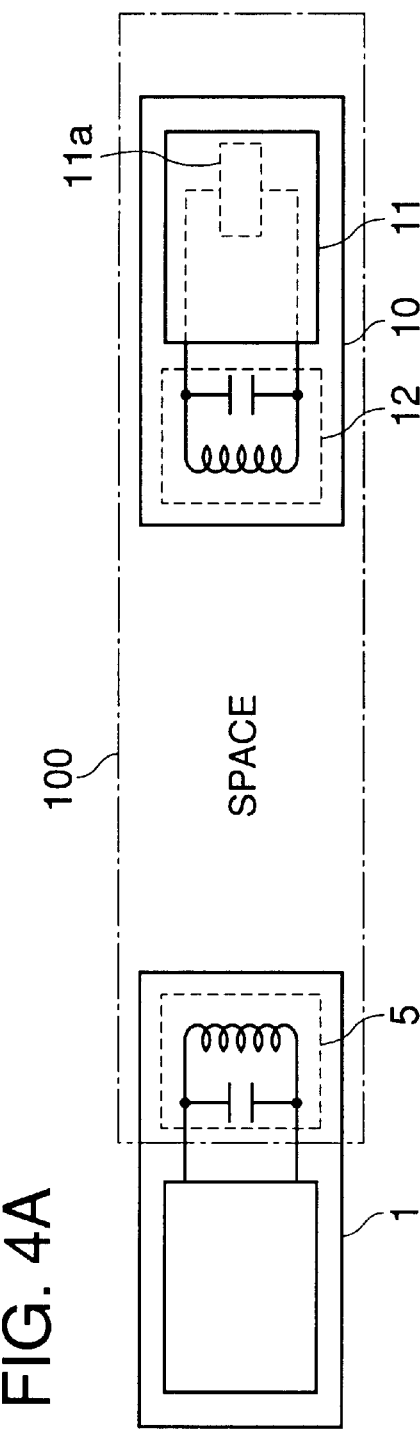
FIGS. 4A to 4D are diagrams showing equivalent circuits of the antenna circuit in a non-contact communication system.
Figure 4B:
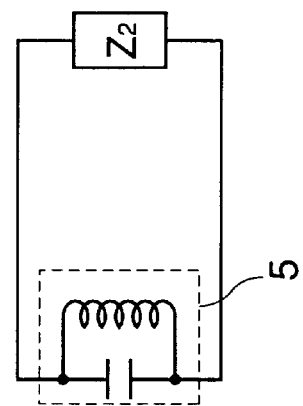
Figure 4C:
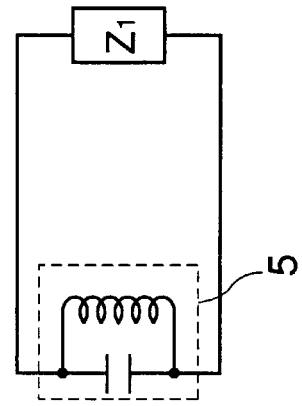
Figure 4D:
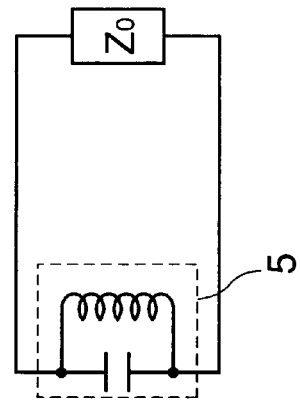

As shown in FIG. 4A, the tuning circuit 5 of the interrogator 1 and the IC 11 of the responder 10, together with the space existing between them, can be regarded as forming an antenna circuit 100. Therefore, if it is assumed that the impedance with which the tuning circuit 5 of the interrogator 1 is loaded equals $Z_0$ as shown in FIG. 4B when the responder 10 is inactive, equals $Z_1$ as shown in FIG. 4C when the responder 10 is active and the switch 14 is open, and equals $Z_2$ as shown in FIG. 4D when the responder 10 is active and the switch 14 is closed, then these values of the impedance exhibit the relationship $Z_0 > Z_1 > Z_2$. In FIG. 4A, reference numeral 11a represents the internal circuit of the IC 11.

In the responder 10, when the tuning circuit 12 tunes in to the radio wave for responder detection, the rectification circuit 13 rectifies the received radio wave and thereby produces the electric power to be supplied within the IC. By using this electric power, the responder 10 attempts to operate. At this time, since the switch 14 in the responder 10 is open, the impedance with which the tuning circuit 5 of the interrogator 1 is loaded changes from $Z_0$ to $Z_1$. A variation in the impedance like this causes consumption of electric power within the responder 10, and thereby reduces the amplitude and thus the power of the radio wave for responder detection.

The output power of the radio wave for responder detection is so controlled as to produce electric power that is insufficient for the operation of the responder 10 within a predetermined range. Therefore, when this radio wave shows a variation in amplitude as described above, it comes to produce less electric power than is necessary to make the responder 10 operate, and thus the responder 10 stops operating. This causes the above-mentioned impedance to return to $Z_0$, allowing the radio wave for responder detection to recover its original amplitude. As a result, the responder 10 starts operating again.

Figure 3:
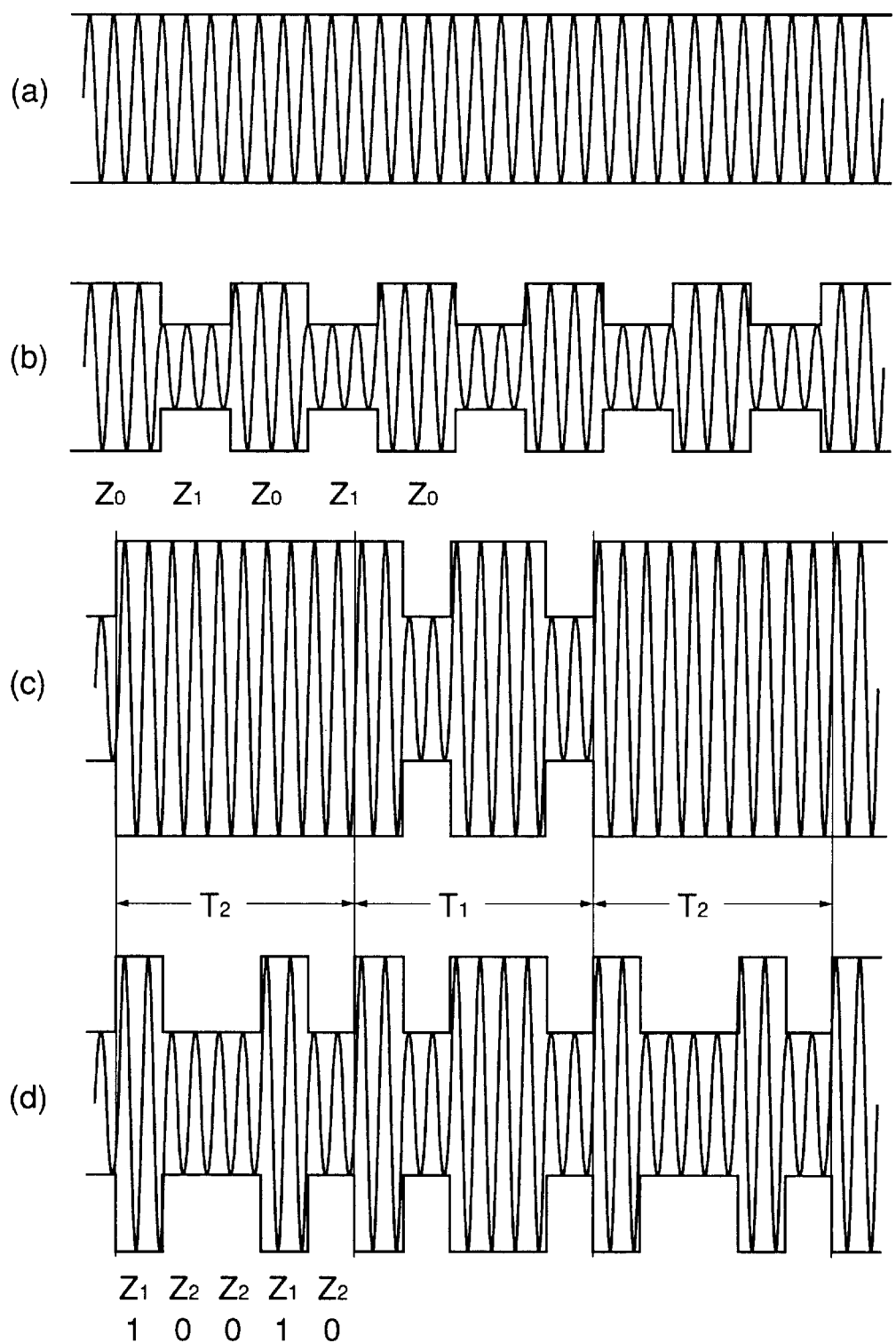
FIG. 3 is a diagram showing the waveforms of the radio waves for responder detection and for communication.

In this way, the responder 10 is activated and deactivated repeatedly, and therefore the radio wave for responder detection now has a waveform of a signal modulated at a fixed frequency f1 as shown at (b) in FIG. 3. Moreover, as a result of repeated activation and deactivation of the responder 10 as described above, even if the interrogator 1 transmits a radio wave carrying data, the data processing circuit 17 cannot process the data properly, and therefore the data processing circuit 17 never controls the switch 14. Accordingly, when the responder 10 is active, the switch 14 remains open, and thus the above-mentioned impedance equals $Z_1$.

The signal, modulated as described above, output from the tuning circuit 5 of the interrogator 1 is detected by the second signal detector 7 by the use of a resonant circuit tuned to the frequency f1 of that signal, and the detection output is fed to the controller 8.

On detecting this signal having the frequency f1, the interrogator 1 recognizes, through the operation of the controller 8, that the responder 10 is present within a communicable range. Now, the controller 8 controls the output power adjuster 4 to increase the output of the transmitted signal, deactivates the second signal detector 7, and activates the first signal detector 6. Moreover, simultaneously, the controller 8 starts feeding a modulation signal to the modulation circuit 3. Thus, switching from the detection mode to the communication mode is achieved.

At this time, the carrier fed from the carrier feeding circuit 2 is modulated in the modulation circuit 3 in accordance with the data Q fed from the controller 8, and thereafter a radio wave for communication that is amplified by the output power adjuster 4 so as to have electric power sufficient to make the responder 10 operate is transmitted from the tuning circuit 5. This radio wave for communication is a radio-frequency signal in which modulated waves that are modulated in accordance with the data Q and non-modulated waves that are not modulated in accordance with the data Q appear alternately in periods T1 and T2, respectively, as shown at (c) in FIG. 3.

When the tuning circuit 12 of the responder 10 receives the radio wave for communication, the radio wave for communication is rectified by the rectification circuit 13 to produce electric power, and, by using this electric power, the responder 10 starts operating. At this time, the data Q obtained by demodulating the modulated waves appearing in the periods T1 of the radio wave for communication by the use of the demodulation circuit 15 is processed by the data processing circuit 17, and the data processing circuit 17 outputs reply data A. The reply data A is composed of a train of pulses, by which the switch 14 is turned on and off. Turning on and off the switch 14 in this way causes the impedance with which the tuning circuit 5 of the interrogator 1 is loaded to vary in such a way as to be equal to $Z_1$ when the switch 14 is off and equal to $Z_2$ when the switch 14 is on.

As the above-mentioned impedance with which the tuning circuit 5 is loaded varies, the non-modulated waves in the periods T2 are amplitude-modulated in accordance with the reply data A as shown at (d) in FIG. 3. This signal is detected by the first signal detector 6, and the detected signal is fed to the controller 8.

On completion of communication between the interrogator 1 and the responder 10 as described above, switching from the communication mode back to the detection mode is achieved. At this time, the controller 8 stops feeding the modulation signal to the modulation circuit 3, and adjusts the setting of the output power adjuster 4 so as to reduce the output from the output power adjuster 4. In addition, the second signal detector 7 is activated, and the first signal detector 6 is deactivated.

Figure 7:
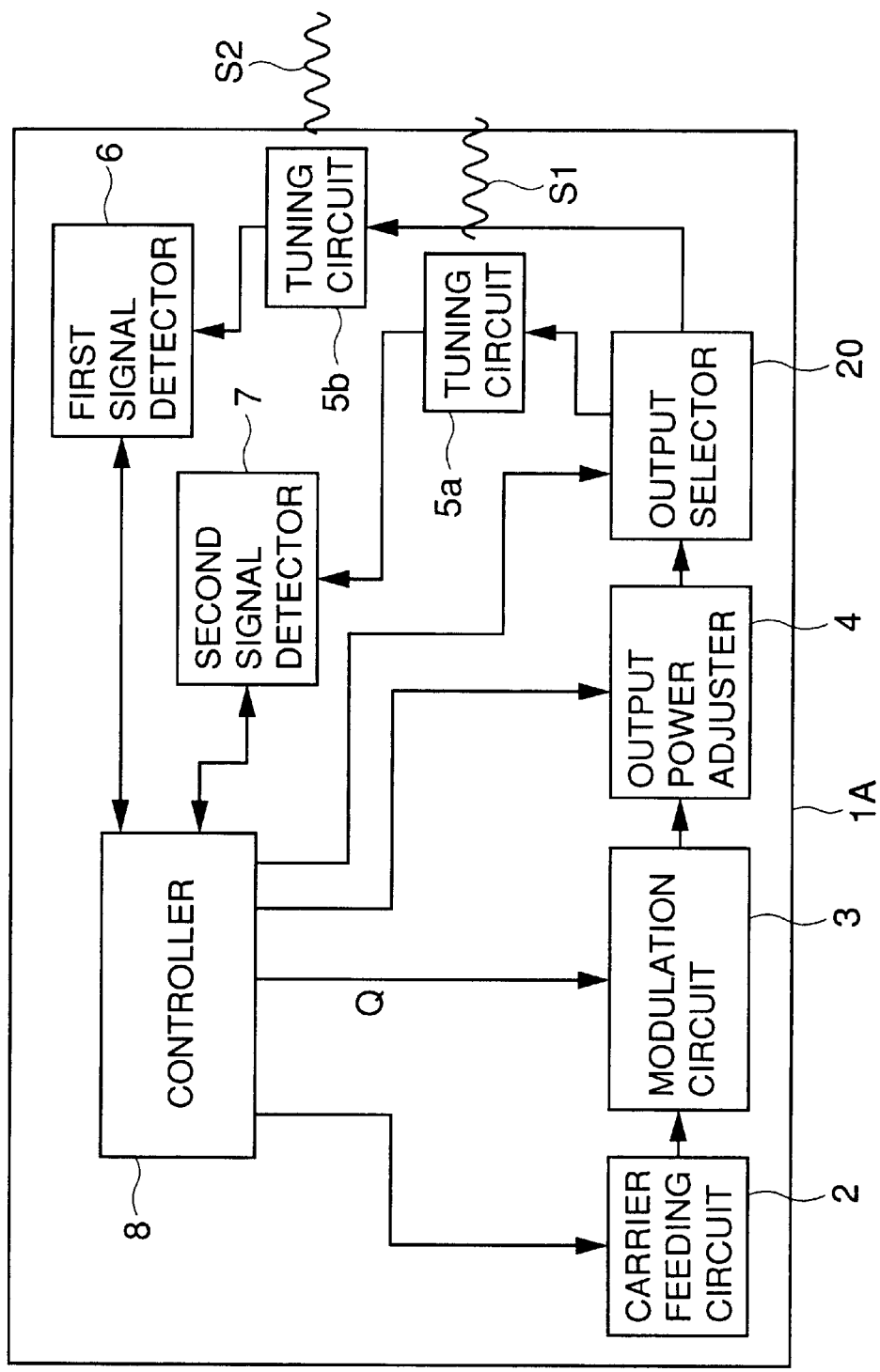
FIG. 7 is a block diagram showing the internal configuration of the interrogator having two tuning circuits adopted in the invention.

In the embodiment under discussion, the interrogator 1 uses only one tuning circuit 5 to transmit the radio wave for responder detection and the radio wave for communication, and uses one of two separate signal detectors 6 and 7, according to whether it is operating in the detection or communication mode. However, it is also possible, as shown in FIG. 7, to provide the interrogator 1A with a tuning circuit 5a for transmitting a radio wave for responder detection, a tuning circuit 5b for transmitting a radio wave for communication, and an output selector 20 between these tuning circuits 5a and 5b and the output power adjuster 4, with the tuning circuits 5a and 5b connected to the signal detectors 6 and 7, respectively.

When this interrogator 1A is used, as a means for recognizing presence of the responder 10 within a communicable range and as a means for achieving communication with the responder 10, the same means as described above can be used. However, on switching from the detection mode to the communication mode and vice versa, the controller 8 needs to switch not only the setting of the output power of the output power adjuster 4 but also the output selector 20 to switch the destination of the output between the tuning circuits 5a and 5b. Specifically, the controller 8 switches the output selector 20 in such a way that, in the detection mode, a feeble radio wave S1 is transmitted from the tuning circuit 5a and, in the communication mode, an amplified radio wave S2 is transmitted from the tuning circuit 5b.

When a responder 10A (FIG. 5) having a specialized circuit that operates on the radio wave for responder detection as will be described later in connection with the second embodiment is used, the impedance $Z_1$ shown at (b) in FIG. 3 may be different from the impedance $Z_1$ shown at (d) in FIG. 3.

A second embodiment of the present invention will be described with reference to FIGS. 1 and 5. The interrogator employed in this embodiment has the same configuration as the integrator shown in FIG. 1 employed in the first embodiment.

Figure 5:
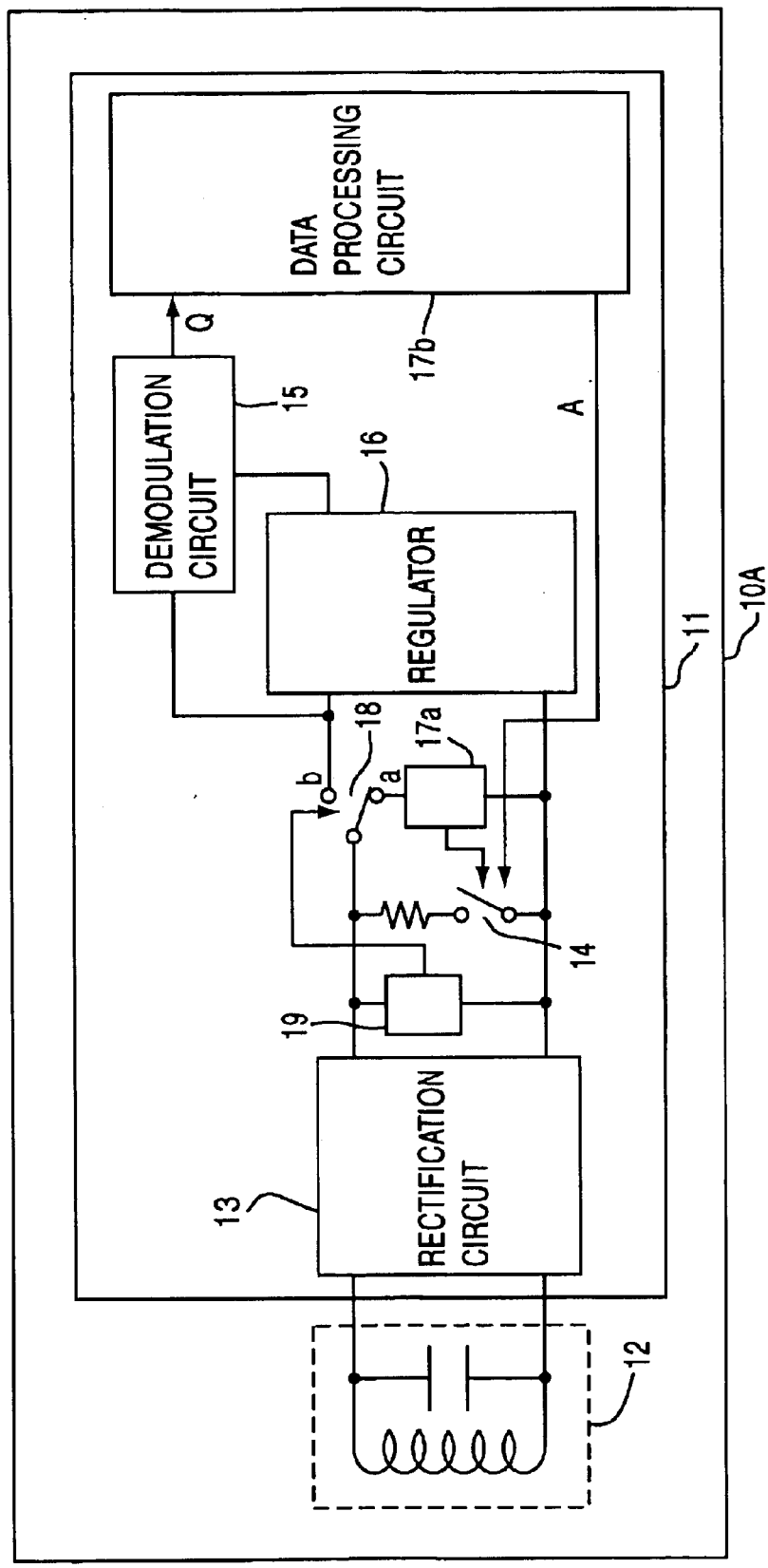
FIG. 5 is a block diagram showing the internal configuration of the responder adopted in the second embodiment of the invention.

FIG. 5 is a block diagram showing the internal configuration of the responder 10A employed in this embodiment. This responder 10A, like the responder 10 employed in the first embodiment, has a tuning circuit 12 that tunes in to the carrier having the frequency f transmitted from the interrogator 1, and has, within an IC 11, a rectification circuit 13, a switch 14, a demodulation circuit 15, and a regulator 16. In addition, within IC 11, the responder 10A further has a first data processing circuit 17a that can operate n comparatively low power, a second data processing circuit 17b for performing signal processing in the communication mode, a switch 18, and switching controller 19 for controlling the switch 18.

In a non-contact communication system employing an interrogator 1 and a responder 10A that are configured as described above, when the responder 10A is not in a range communicable with the interrogator 1, the interrogator 1 operates in the detection mode as in the first embodiment, and therefore the output power adjuster 4 controls the output power of the radio wave for communication so that a radio wave 10 dB weaker than the radio wave for communication is transmitted as the radio wave for responder detection from the tuning circuit 5.

Also in this embodiment, as in the first embodiment, no modulation signal is added to the radio wave for responder detection. However, it is also possible to use as the radio wave for responder detection a radio wave having a modulation signal added thereto.

When the tuning circuit 12 of the responder 10A receives the radio wave for responder detection, the radio wave for responder detection is rectified by the rectification circuit 13 to produce electric power, and, by using this electric power, the responder 10A starts operating. At this time, the switch 18 is in the contact "a" position, and therefore the electric power produced by the rectification circuit 13 is supplied to the first data processing circuit 17a, which is thereby activated. On the other hand, no electric power is supplied to the second data processing circuit 17b, which therefore remains inactive.

When the first data processing circuit 17a starts operating, it outputs data composed of a train of pulses having a fixed frequency f2. In synchronism with this data, the switch 14 is turned on and off repeatedly to vary the impedance of the tuning circuit 12.

By varying the impedance of the tuning circuit 12 as described above, the radio wave for responder detection is amplitude-modulated by the frequency f2. The resulting modulated signal causes the impedance across the tuning circuit 5 of the interrogator 1 to vary. This variation is detected by the second signal detector 7 by the use of a resonant circuit tuned to the frequency f2 of that signal, and the detection output is fed to the controller 8.

On detecting the above-mentioned signal, the interrogator 1 recognizes, through the operation of the controller 8, that the responder 10A is present within a communicable range. Now, the controller 8 controls the output power adjuster 4 to increase the output of the transmitted signal, deactivates the second signal detector 7, and activates the first signal detector 6. Thus, switching from the detection mode to the communication mode is achieved. In the communication mode, the interrogator 1 operates in the same manner as in the first embodiment to transmit the radio wave for communication while feeding a modulation signal to the modulation circuit 3. When the tuning circuit 12 of the responder 10A tunes in to the radio wave for communication, an abrupt increase in the electric power that is producing the radio wave is detected by the switching controller 19, which then switches the switch 18 to the contact "b" position.

When the responder 10A becomes ready to communicate with the, interrogator 1 in this way, communication as performed in the first embodiment is started. On completion of communication, or when the electric power supplied to the responder 10A weakens, the interrogator 1 is brought back into the detection mode, and thus the switching controller 19 switches the switch 18 back to the contact "a" position. Note that the second data processing circuit 17b in this embodiment corresponds to the data processing circuit 17 in the first embodiment, and thus the former operates in the same manner as the latter. Moreover, also in this embodiment, as in the first embodiment, it is possible to use an interrogator 1A having separate tuning circuits 5a and 5b for the detection and communication modes as shown in FIG. 7.

Next, a third embodiment of the present invention will be described with reference to FIGS. 2 and 6. The responder employed in this embodiment has the same configuration as the responder shown in FIG. 2 employed in the first embodiment.

Figure 6:
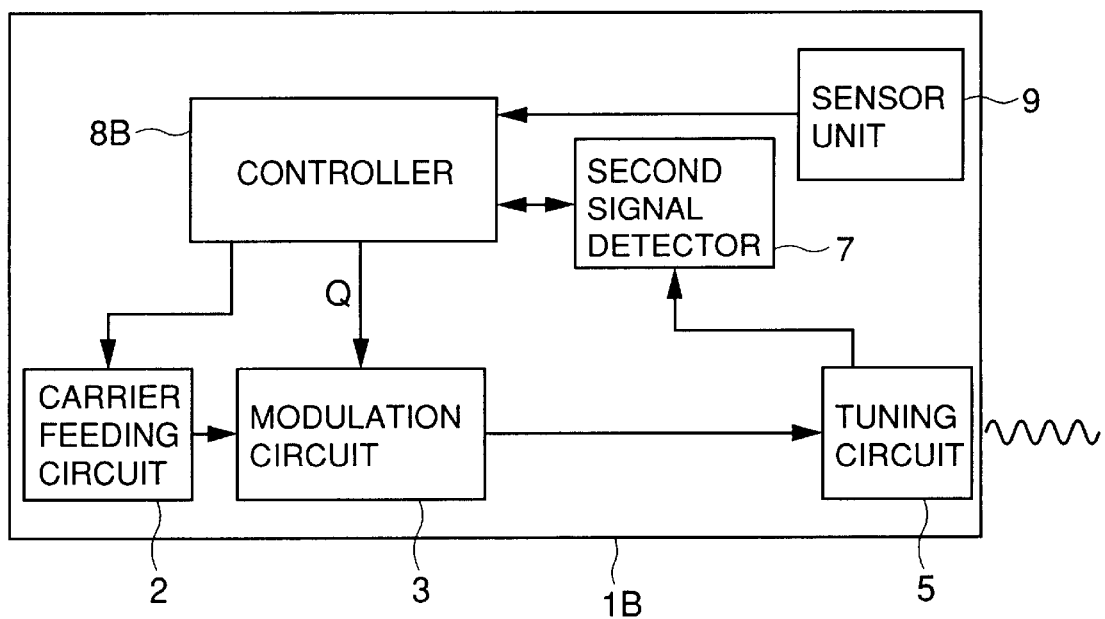
FIG. 6 is a block diagram showing the internal configuration of the interrogator adopted in the third embodiment of the invention.

FIG. 6 is a block diagram showing the internal configuration of the interrogator 1B employed in this embodiment. This interrogator 1B has a controller 8B, a carrier feeding circuit 2 for feeding a carrier having a predetermined frequency f, a modulation circuit 3 for modulating the carrier in accordance with the data fed from the controller 8B, a tuning circuit 5 having functions of transmitting and receiving a radio wave, and a second signal detector 7 for detecting a reply signal from the responder 10, and a sensor unit 9 having an optical sensor or the like for recognizing presence of the responder 10 within a range communicable with the interrogator 1B. The controller 8B is composed of a microcomputer or the like, and controls the carrier feeding circuit 2, the modulation circuit 3, and the second signal detection circuit 7.

When the responder 10 is placed near the sensor unit 9 of the interrogator 1B configured as described above, the optical sensor provided in the sensor unit 9 optically detects approach of the responder 10 to the interrogator 1B. The detection output is fed to the controller 8B. As a result, the controller 8B activates the entire interrogator 1B so that the interrogator 1B communicates with the responder 10.

Then, the interrogator 1B operates in the same manner as it does in the communication mode in the first and second embodiments, except that, in this embodiment, no radio wave is transmitted for responder detection in the detection mode. Therefore, the descriptions of overlapping details will not be repeated.

In this embodiment, an optical means, namely an optical sensor, is used as a switch to make the interrogator 1B start communication. However, it is also possible to use instead a mechanical means so that, for example, a touch on a touch panel makes the interrogator 1B start communication.

What is claimed is:

1. A non-contact communication system comprising:
   a first communication unit for selectively radiating through a common tuning circuit thereof one of a radio wave for communication and a radio wave for detection, the radio wave for communication having alternately a period in which the radio wave is not modulated and a period in which the radio wave is modulated in accordance with data to be transmitted, the radio wave for detection having a smaller amplitude than the radio wave for communication and comprising only a carrier without including the data to be transmitted and data to be received; and
   a second communication unit for communicating with the first communication unit by modulating the radio wave for communication in accordance with reply data during said period in which the radio wave is not modulated,
   wherein the first communication unit generates a radio wave for detection;
   the second communication unit causes a frequency different from a frequency of the radio wave for detection to be superimposed on the radio wave for detection because an impedance with which the tuning circuit of the first communication unit is loaded when the second communication unit repeatedly switches between an operative state during which the second communication unit obtains power for functioning by tuning in to the radio wave for detection and a non-operative state during which the second communication unit obtains no power for functioning by detuning in to the radio wave for detection, and
   the first communication unit, by detecting said frequency which is different from the frequency of the radio wave for detection and superimposed on the radio wave for detection, recognizes that the second communication unit is present within a range communicable with the first communication unit and then starts transmitting the radio wave for communication.

2. A non-contact communication system as claimed in claim 1, wherein the first communication unit has:
   a frequency detecting means for detecting the frequency superimposed on the radio wave transmitted from the first communication unit, the frequency resulting from repeated switching between an activation period in which the second communication unit is activated by power of the radio wave for detection and a deactivation period in which the second communication unit is deactivated because of insufficient power of the radio wave for detection because the radio wave for detection transmitted from the first communication unit is so feeble as to be equal to critical strength that divides between activation and deactivation of the second communication unit when the second communication unit is present within the range communicable with the first communication unit;
   a checking means for checking whether the second communication unit is present within the range communicable with the first communication unit or not on a basis of an output from the frequency detecting means; and
   a control means for controlling the first communication unit to transmit the radio wave for communication on a basis of an output from the checking means.

3. A non-contact communication system as claimed in claim 1,
   wherein the second communication unit has a signal generating means for generating a reply data signal by changing an internal impedance thereof according to the reply data and changing an amplitude of the radio wave for communication when the second communication unit catches the radio wave for communication transmitted from the first communication unit so as to make the first communication unit recognize that the second communication unit is present within the range communicable with the first communication unit.

4. A non-contact communication system as claimed in claim 1,
   wherein the first communication unit transmits alternatively the radio wave for communication or the radio wave for detection, both of which are different only in an amplitude thereof, by using a single transmission means shared between those two radio waves.

5. A non-contact communication system as claimed in claim 4,
   wherein the first communication unit has:
   a frequency detecting means for detecting the frequency superimposed on the radio wave transmitted from the first communication unit, the frequency resulting from repeated switching between an activation period in which the second communication unit is activated by power of the radio wave for detection and a deactivation period in which the second communication unit is deactivated because of insufficient power of the radio wave for detection because the radio wave for detection transmitted from the first communication unit is so feeble as to be equal to critical strength that divides between activation and deactivation of the second communication unit when the second communication unit is present within the range communicable with the first communication unit;
   a checking means for checking whether the second communication unit is present within the range communicable with the first communication unit or not on a basis of an output from the frequency detecting means; and
   a control means for controlling the first communication unit to transmit the radio wave for communication on a basis of an output from the checking means.

6. A non-contact communication system as claimed in claim 4,
   wherein the second communication unit has a signal generating means for generating the reply data signal by changing an internal impedance thereof according to a the reply data and changing an amplitude of the radio wave for communication when the second communication unit catches the radio wave for communication transmitted from the first communication unit so as to make the first communication unit recognize that the second communication unit is present within the range communicable with the first communication unit.

7. A non-contact communication system comprising:

a first communication unit for selectively radiating through a common tuning circuit thereof one of a radio wave for communication and a radio wave for detection, the radio wave for communication having alternately a period in which the radio wave is not modulated and a period in which the radio wave is modulated in accordance with data to be transmitted, the radio wave for detection having a smaller amplitude than the radio wave for communication and comprising only a carrier without including the data to be transmitted and data to be received; and a second communication unit having a resonant circuit and operating on electric power generated in the resonant circuit, wherein, when the first communication unit transmits the radio wave for detection and the second communication unit is within a range communicable with the first communication unit, a cyclical state change, occurs in the second communication unit; and the cyclical state change consisting of an increase of the electric power higher than a predetermined value by which the second communication unit is activated, a loading of the resonant circuit, a decrease in an impedance thereof below a predetermined level, a decrease of the electric power lower than the predetermined value, an unloading of the resonant circuit, and an increase in the impedance thereof higher than the predetermined level, causes an impedance with which the common a tuning circuit of the first communication unit is loaded to fluctuate at a predetermined frequency different from a frequency of the radio wave for detection, a wherein the first communication unit transmits the radio wave for communication after having sensed a presence of the second communication unit by detecting the fluctuations of the impedance with which the tuning circuit of the first communication unit is loaded.

* * * * *